June 30, 1925.
H. J. C. WELLS
LIQUID RAISING SYSTEM
Filed Feb. 21, 1923
1,544,082
2 Sheets-Sheet 2
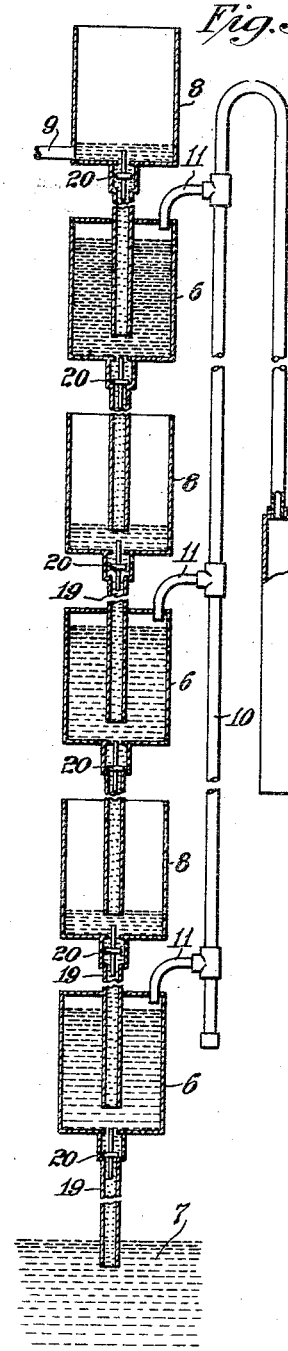
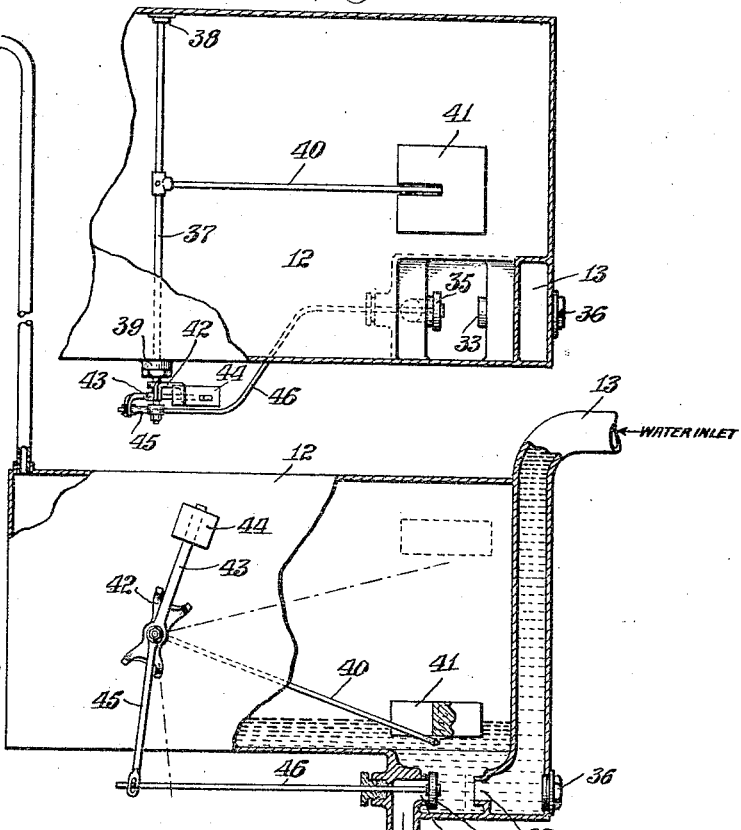
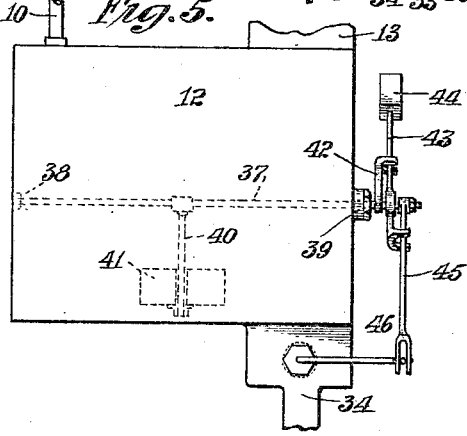
INVENTOR
Herbert James Clement Wells
ATTORNEY Patented June 30, 1925.

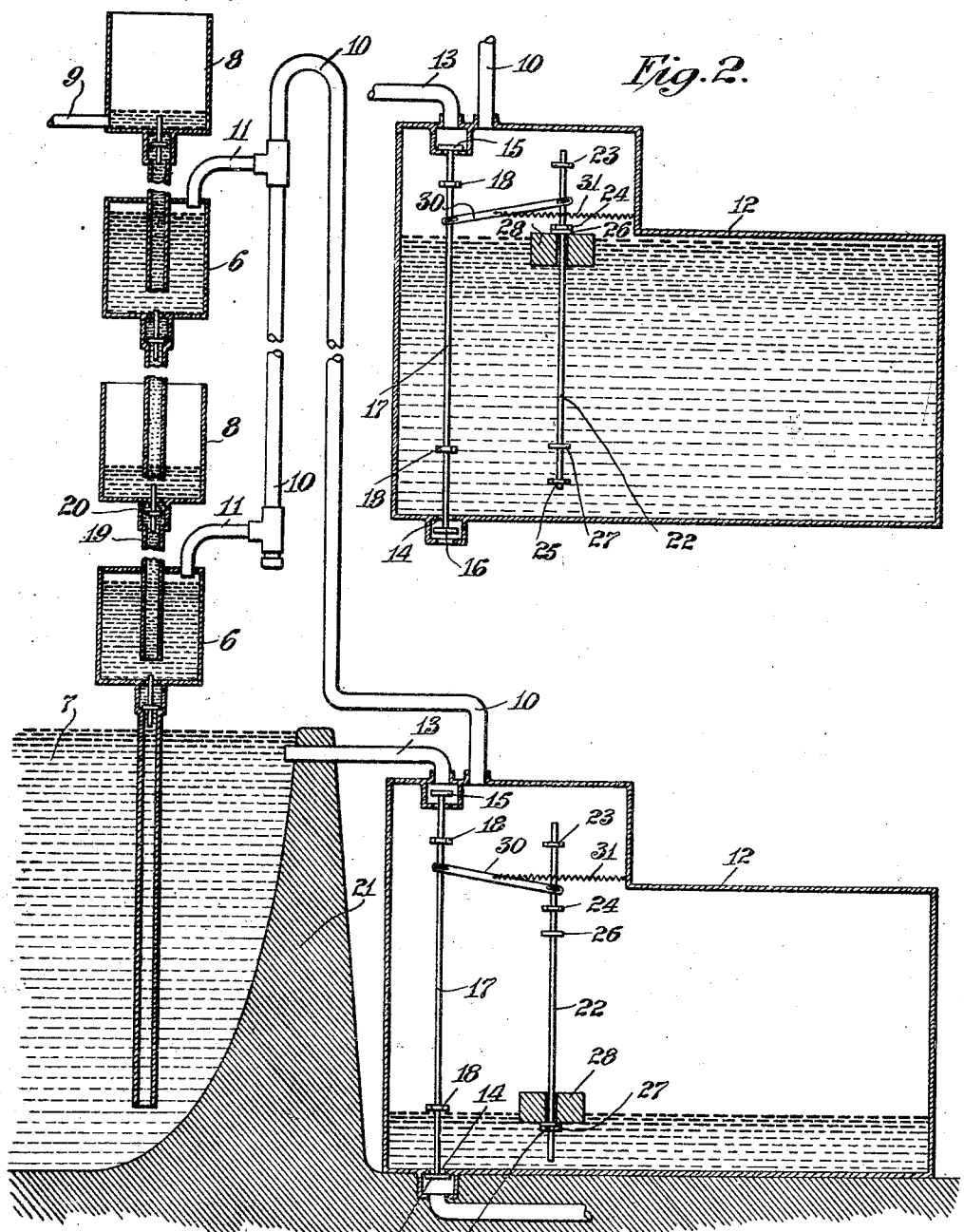

1,544,082

UNITED STATES PATENT OFFICE.

HERBERT JAMES CLEMENT WELLS, OF NEW YORK, N. Y.

LIQUID-RAISING SYSTEM.

Application filed February 21, 1923. Serial No. 620,337.

*To all whom it may concern:*

Be it known that I, HERBERT JAMES CLEMENT WELLS, a subject of the King of Great Britain, and residing at borough of Manhattan, New York, in the county of New York and State of New York, have invented new and useful Improvements in Liquid-Raising Systems, of which the following is a specification.

This invention relates to a system for raising liquid from a low supply to any desired height and more particularly to a system employing falling water as a source of power.

An important object of the invention is to provide such a system which may be cheap to construct and so simple in operation as to be entirely automatic.

According to this invention one or more pairs of tanks are positioned above the liquid to be raised, each pair comprising a closed tank below an open tank. One-way upward flow connections join the supply of liquid to the lowest closed tank, and each tank to the next higher one in the series. A suitable pipe is connected near the upper portion of each of the closed tanks. If the closed tanks are initially filled, as through ports which are then hermetically sealed, pressure applied to the pipe will force the liquid in each closed tank through the one way upward flow connection to the next higher open tank, and if suction be then applied to the pipe, the pressure of the atmosphere will force liquid from the supply and each open tank into the next higher closed tank. Obviously the vertical distance permissible between adjacent tanks is a function of the density of the liquid to be raised and the atmospheric pressure at the place of operation, this distance being about thirty-two feet when water is the liquid to be raised from a point near sea level. By using enough pairs of tanks it is obvious that liquid can be raised to any desired height.

Figure 1 is a section through a series of tanks and a chamber using a difference in water level as a source of power for carrying out the invention, the system being shown at the end of the suction stage of the cycle.

Fig. 2 is a fragmentary section showing the chamber at the end of the pressure stage of the cycle.

Fig. 3 is a section of a system employing modified means for controlling the water level in the chamber.

Fig. 4 is a plan view of the chamber shown in Fig. 3, and

Fig. 5 is a left end view of the chamber and controlling means.

The apparatus illustrated in Figs. 1 and 2 comprises a closed tank 6 positioned above a supply 7 of liquid to be raised which consists in the present instance of water backed up behind a dam 21. Above the tank 6 is a tank 8 open to the atmosphere. As many additional pairs of open and closed tanks 6, 8 as are required to raise the liquid to the desired level may be placed above the lowest pair. The highest open tank 8 has a conduit 9 to deliver the raised liquid to any desired point. The bottom of each tank is connected to the lower portion of the next lower tank and the lowest closed tank is connected to the supply of liquid to be pumped, by any suitable one-way upward flow connections. In the present embodiment these connections consist of pipes 19 provided with check valves 20. A pipe 10 having branches 11 leading to the upper portion of the closed tanks 6, connects said tanks to the upper portion of a closed chamber 12 located below the dam. A water inlet 13 connects the top of chamber 12 to the water behind the dam. The height of the chamber should ordinarily equal the total fall between the source of water power and the lowest available point of discharge from the bottom of the chamber, or where the ebb and flow of the tide is used to supply power, the height of the chamber may equal the rise of the tide from low to high water. An outlet port 14 permits discharge of the water from the chamber.

The inlet and outlet ports are controlled in any suitable manner, as by valves 15 and 16 which may be conveniently mounted on a stem 17 reciprocable in fixed guides 18 to permit either valve being open while the other is closed. Valve stem 17 is actuated by any suitable mechanism which will raise the stem to open the inlet port and close the outlet port when the water level in the chamber has fallen to a predetermined point, and which will lower the stem to close the inlet port and open the outlet port when the water in the chamber reaches a predetermined high level. For example a rod 22 may be reciprocably mounted between guides 23, 24 and 25. Discs 26, 27 fixed to the rod limit its travel by abutment against guides 24 and 25 respectively. A float 28 is loosely mounted on the rod between the discs. A link 30 is pivotally mounted to operatively connect the valve stem 17 to rod 22. A tension spring 31 is secured at one end to a point on the wall of the chamber midway in height between the extreme upper and lower positions of the pivot between link 30 and rod 22.

To commence operation, either the open or the closed tanks are all filled with the liquid to be raised and the inlet 13 is installed. The chamber 12 being empty, as shown in Fig. 1, float 28 is resting on disc 27, rod 22 is in its down position, and valve stem 17 is in its up position opening the inlet and closing the outlet valves. As water flows through inlet 13 it displaces the air in the chamber which is blown through pipe 10 and branches 11 into the closed tanks 6. If these tanks were filled, the contained liquid, being prevented by check valves 20 from flowing downwardly, is forced up through pipes 19 to fill the open tanks. If the open tanks were initially filled, the air bubbles up through them and escapes. In either case the open tanks will be nearly full when water has filled chamber 12 to a level such that float 28 has risen until it abuts disc 26. During further rising of the float the filling of open tanks 8 is completed, until when rod 22 raises its pivot for link 30 beyond the point of support of spring 31, the tension of the spring is suddenly applied to the lower side of link 30, disc 26 is snapped into abutment with guide 24 and valve stem 17 is lowered to close the inlet port and open the outlet port.

The water in chamber 12 now flows out, drawing air from closed tanks 8 through pipe 10. The atmospheric pressure therefore forces liquid from the supply and from each open tank into the next higher closed tank to replace the air withdrawn. The water continues to run out of chamber 12 until float 28 by pressing on disc 27 lowers rod 22. At this time the closed tank 6 are nearly full. In lowering the end of link 30 pivoted to rod 22 the tension of spring 31 is suddenly applied to the upper side of link 30, and valve stem 17 is snapped to its up position to recommence the cycle. Thus the chamber will continue to automatically fill and empty as long as water is supplied to the intake end of inlet 13, and the closed and open tanks will be alternately filled from below and emptied into the next higher tanks. Obviously by duplicating the apparatus a continuous delivery of liquid to the highest tank may be maintained.

The apparatus shown in Figs. 3, 4 and 5 operates upon the same principle as that previously described, only the specific mechanism for automatically filling and emptying chamber 12 being different. In this construction the inlet 13 terminates in a port 33 at the bottom of the chamber and opposite an outlet port 34 so that a single valve 35 may control both ports. In some cases the water supply may enter the inlet through a port normally closed by a plug 36 instead of at the higher level shown. A horizontal shaft 37 is rotatably mounted in a bearing 38 and stuffing box 39 through which it projects beyond the chamber. A lever 40 is supported at one end for rotation with shaft 37, and at its free end carries a float 41. Just outside box 39 a forked member 42 is rigidly mounted on shaft 37. A lever 43 loosely mounted on shaft 37, having a bifurcated lower arm and carrying a weight 44 on its upper arm is free to move between the prongs of fork 42. A rod 45 journalled on shaft 37 has a pin and slot connection with the stem 46 of valve 35. The lower forked end of lever 43 spans rod 45 to provide a lost motion connection between said lever and rod, and fork 42 provides a lost motion connection between shaft 37 and lever 43.

When the system is installed, either the open or closed tanks are initially filled, and chamber 12 and its controlling apparatus are in the condition illustrated in Fig. 3. As water flows in through port 33, air is forced through pipe 10 and branches 11 into closed tanks 6 to raise the water from them to the next higher open tanks. Float 41 is carried up by the rising water, and rotates shaft 37 and fork 42 anticlockwise until the right hand prong of fork 42 engages lever 43. Further lifting of the float moves lever 43 and weight 44 to the left until the dead center is reached just as the chamber 12 is nearly full and all the water has been pumped from closed tanks 6 to open tanks 8. A very small upward movement of the float then permits weight 44 to fall to the left, causing the left hand prong of the lower forked end of lever 43 to strike rod 45 a sharp blow which snaps stem 46 to the right, opening outlet port 34 and closing inlet port 33. The water now runs out of chamber 12, creating a vacuum which acts through pipe 10 to suck liquid up into each closed tank 6, until the lowering of float 41 brings the left hand prong of fork 42 into engagement with lever 43, and causes the lever to snap over to its right hand position (as shown in Fig. 3) and to snap valve 35 to the left to open the inlet and close the outlet port. The pressure stage of the cycle then begins again, and the chamber is alternately filled and emptied so long as water is supplied to inlet 13.

Where the head of the water supplied to inlet port 33 varies, as for example, with the seasons of the year, the apparatus is capable of adjustment to run on any available head of water. For instance by changing fork 42 to one having a smaller span between the prongs, and similarly changing lever 43, the valve 35 may be controlled by movement of the float between any predetermined water levels in the tank. The vertical distance between the lower end of each pipe 19 entering a closed tank and the bottom of the next higher open tank must also be adjusted, since this distance cannot exceed the difference in elevation of water available as a source of power.

What I claim is:

1. In a liquid raising system having an open tank above a closed tank positioned above a supply of liquid to be raised, and one-way upward flow connections from the supply to the closed tank and from the closed tank to the open tank, the combination of a closed chamber connected to the upper portion of each closed tank, an outlet for said chamber, an inlet, a valve device for opening either said outlet or said inlet and concurrently closing the other, and means for operating said valve device comprising a pivoted member swingable between two extreme positions, means acting constantly on said pivot member to cause resistance to movement thereof from either of its extreme positions to its central position and then to cause the pivoted member to move rapidly to complete its movement to the other extreme position, means, including a float in the chamber and having a lost motion connection with the pivoted member, to shift the pivoted member from either of its extreme positions past its central position to cause filling or draining of the tank in accordance with the direction of such movement.

2. In a liquid raising system having an open tank above a closed tank positioned above a supply of liquid to be raised, and one-way upward flow connections from the supply to the closed tank and from the closed tank to the open tank, the combination of a closed chamber below the liquid supply, a connection between the chamber and the upper portion of the closed tank, an inlet port and an outlet port for the chamber, a valve to control said ports, and valve controlling means comprising a pivoted arm, a pivoted member having lugs spaced on opposite sides of the arm to engage and actuate the same after a lost motion movement and having a weight above its pivot affected by gravity when such member is swung from one side to the other of its central position to actuate said arm, and means controlled by the height of the liquid in said chamber for shifting said member to overbalance the same in one direction or the other.

3. In a liquid raising system having an open tank above a closed tank positioned above a supply of liquid to be raised, and one-way upward flow connections from the supply to the closed tank and from the closed tank to the open tank, the combination of a closed chamber connected to the upper portion of the closed tank and located below the liquid supply, an outlet at the lower part of said chamber, an inlet in alignment with said outlet, a valve reciprocable to close either the inlet or the outlet and concurrently open the other, a pivoted device so top heavy as to be capable, when swung to either side of its pivot, of operating the valve in the corresponding manner, a lost motion connection between the top heavy device and the valve to delay movement of the valve until the top heavy device has been swung past the pivot, and a float connected with said top heavy device to cause the tank to be emptied when the float is raised above a certain height and to be filled when the tank has been drained to the desired extent.

4. In a liquid raising system having an open tank above a closed tank positioned above a supply of liquid to be raised, and one-way upward flow connections from the supply to the closed tank and from the closed tank to the open tank, the combination of a closed chamber connected to the upper portion of the closed tank and located below the liquid supply, an outlet at the lower part of said chamber, an inlet in alignment with said outlet, a valve reciprocable to close either the inlet or the outlet and concurrently open the other, a pivoted device so top heavy as to be capable, when swung to either side of its pivot, of operating the valve in the corresponding manner, a lost motion connection between the top heavy device and the valve to delay movement of the valve until the top heavy device has been swung past the pivot, and a float connected with said top heavy device to cause the tank to be emptied when the float is raised above a certain height and to be filled when the tank has been drained to the desired extent, the connection between the float and top heavy device having lost motion provisions to permit the top heavy device to act rapidly when swung to either side of said pivot.

5. In a liquid raising system having an open tank above a closed tank positioned above a supply of liquid to be raised, and one-way upward flow connections from the supply of the closed tank and from the closed tank to the open tank, the combination of a closed chamber below the liquid supply, a connection between the chamber and the upper portion of the closed tank, an inlet and an outlet, valve means to close either said inlet or said outlet and open the other concurrently, a reciprocable member for operating said valve means, a pivoted arm for actuating said reciprocable member, a pivoted member so top heavy as, when moved to either side of its pivot, to operate said pivoted arm and having lugs on opposite sides of said arm spaced to provide a lost motion connection therewith, a float in the chamber, and a float controlled member pivoted to turn about the same axis as the top heavy member and having a lost motion connection therewith to avoid interference with the movement of the top heavy member after moving it to carry its center of gravity past its pivot.

6. In a liquid raising system having an open tank above a closed tank positioned above a supply of liquid to be raised, and one-way upward flow connections from the supply of the closed tank and from the closed tank to the open tank, the combination of a closed chamber below the liquid supply, a connection between the chamber and the upper portion of the closed tank, an inlet and an outlet at the bottom of said tank, means, including a horizontally reciprocable link at the outside of the chamber, to open either said inlet or said outlet and close the other concurrently, and means for actuating said link comprising a float, an arm connected with said float, a shaft carrying said arm and projecting outside of the chamber, an upwardly extending member fixed on said shaft and having thereon two spaced lugs, a lever pivoted on said shaft and having a lost motion connection with the upwardly extending member through an upper arm passing between the said lugs, two spaced lugs on the lower end of said lever, an arm loosely mounted on said shaft and extending downwardly between the lugs and said lever, and a connection between the lower end of said downwardly extending arm and the reciprocable link.

HERBERT JAMES CLEMENT WELLS.